United States Patent
Lee et al.

(10) Patent No.: US 8,886,956 B2
(45) Date of Patent: Nov. 11, 2014

(54) DATA STORAGE APPARATUS HAVING CRYPTION AND METHOD THEREOF

(75) Inventors: Woo-hyun Lee, Seoul (KR); Bum-seok Yu, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 723 days.

(21) Appl. No.: 12/728,325

(22) Filed: Mar. 22, 2010

(65) Prior Publication Data

US 2011/0072276 A1    Mar. 24, 2011

(30) Foreign Application Priority Data

Sep. 22, 2009    (KR) ........................ 10-2009-0089644

(51) Int. Cl.
| | | |
|---|---|---|
| G06F 12/14 | (2006.01) | |
| G06F 21/80 | (2013.01) | |
| G11B 20/00 | (2006.01) | |
| G06F 3/06 | (2006.01) | |

(52) U.S. Cl.
CPC ............ G11B 20/0021 (2013.01); G06F 21/80 (2013.01); G11B 20/00507 (2013.01); G11B 20/00086 (2013.01); G06F 3/0659 (2013.01); G06F 12/1408 (2013.01); G06F 3/0679 (2013.01); G11B 20/00246 (2013.01)
USPC .......................................................... 713/189

(58) Field of Classification Search
CPC ............ G06F 12/14; G06F 21/00; H04L 9/00
USPC .......................................................... 713/189
See application file for complete search history.

(56) References Cited

U.S. PATENT DOCUMENTS

| 5,915,025 | A | 6/1999 | Taguchi et al. | |
|---|---|---|---|---|
| 7,627,756 | B2 | 12/2009 | Fujibayashi et al. | |
| 7,716,496 | B2 | 5/2010 | Kaneda et al. | |
| 8,200,965 | B2 | 6/2012 | Fujibayashi et al. | |
| 2002/0083317 | A1* | 6/2002 | Ohta et al. ..................... | 713/161 |
| 2004/0250092 | A1* | 12/2004 | Hori et al. ..................... | 713/189 |
| 2005/0086471 | A1* | 4/2005 | Spencer ......................... | 713/165 |
| 2006/0140408 | A1* | 6/2006 | Batcher ......................... | 380/261 |
| 2008/0101605 | A1 | 5/2008 | Kitamura et al. | |
| 2010/0250961 | A1* | 9/2010 | Sato et al. ..................... | 713/189 |
| 2010/0268864 | A1* | 10/2010 | Ramiya Mothilal .......... | 711/103 |
| 2012/0079266 | A1 | 3/2012 | Ogata et al. | |

FOREIGN PATENT DOCUMENTS

| CN | 201060649 | 5/2008 |
|---|---|---|
| JP | 63-211049 | 9/1988 |
| JP | 04-182885 | 6/1992 |
| JP | 2004-185704 | 7/2004 |

(Continued)

OTHER PUBLICATIONS

Japanese Office Action dated May 13, 2014 issued in JP Application No. 2010-209051.

(Continued)

*Primary Examiner* — Brandon Hoffman
*Assistant Examiner* — Samuel Ambaye
(74) *Attorney, Agent, or Firm* — Ellsworth IP Group PLLC

(57) ABSTRACT

A storage apparatus including a storage unit to store data, a processor unit to process the data according to a command received from an external device, a key unit to store a plurality of crypto keys, and a decoder unit to select one of the crypto keys according to address information of the command received from the external device. Hardware encryption is more secure and less complex to manage.

48 Claims, 12 Drawing Sheets

(56) References Cited

FOREIGN PATENT DOCUMENTS

| | | |
|---|---|---|
| JP | 3982530 | 9/2007 |
| JP | 2007-336446 | 12/2007 |
| JP | 2008-299448 | 12/2008 |
| JP | 4566668 | 10/2010 |
| JP | 4728060 | 7/2011 |
| JP | 4877962 | 2/2012 |
| JP | 5488134 | 5/2014 |
| KR | 20050043657 | 5/2005 |
| KR | 20060130013 | 12/2006 |

OTHER PUBLICATIONS

Chinese Office Action dated Jun. 4, 2014 issued in CN Application No. 201010297646.2.

* cited by examiner

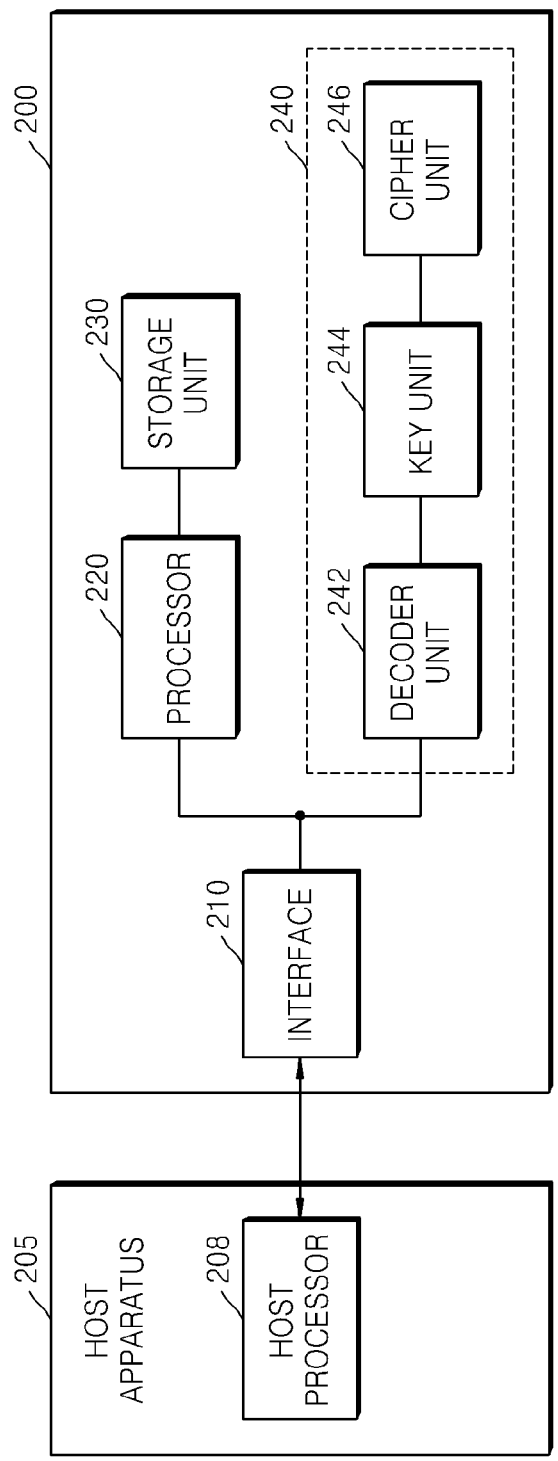

FIG. 5

| | FEATURES | COMMAND | | | | RESERVED (0) | FIS TYPE (27TH) |
|---|---|---|---|---|---|---|---|
| 0 | | | C | R | R | | |
| 1 | DEV/HEAD | CYL HIGH | CYL LOW | | | | SECTOR NUMBER |
| 2 | FEATURES (EXP) | CYL HIGH (EXP) | CYL LOW (EXP) | | | | SECTOR NUM (EXP) |
| 3 | CPNTORL | RESERVED (0) | SECTOR COUNT (EXP) | | | | SECTOR COUNT |
| 4 | RESERVED (0) | RESERVED (0) | RESERVED (0) | | | | RESERVED (0) |

| | | | | | |
|---|---|---|---|---|---|
| 0 | FEATURES | STATUS | R I R RESERVED (0) | FIS TYPE (27TH) | |
| 1 | DEV/HEAD | CYL HIGH | CYL LOW | SECTOR NUMBER | |
| 2 | RESERVED (0) | CYL HIGH (EXP) | CYL LOW (EXP) | SECTOR NUM (EXP) (0) | |
| 3 | RESERVED (0) | RESERVED (0) | SECTOR COUNT (EXP) | SECTOR COUNT | |
| 4 | RESERVED (0) | RESERVED (0) | RESERVED (0) | RESERVED (0) | |

600

DATA STORAGE APPARATUS HAVING CRYPTION AND METHOD THEREOF

CROSS-REFERENCE TO RELATED APPLICATIONS

This application claims priority under 35 U.S.C. §119(a) from Korean Patent Application No. 2009-89644 filed with the Korea Industrial Property Office on Sep. 22, 2009, the disclosure of which is incorporated herein by its reference.

BACKGROUND OF THE INVENTION

1. Field

The present general inventive concept relates to a data storage apparatus and method of encrypting and decrypting data, and more particularly, to an apparatus to process a crypto key and method thereof.

2. Description of the Related Art

Generally, a data storage device is a computing device that reads data from and writes data onto storage media. A data storage device may contain moving parts or may not have any significant moving parts. An example of a data storage device with moving parts is a traditional disk drive where a disk, e.g., a spinning platter, rotates and has one or more heads that read and write data. A data storage device without any significant moving parts is generally referred to as a solid-state drive.

A secure disk drive supports data encryption at the drive using a partial or full disc encryption technique in which an encryption key is used to encrypt data on a storage medium. In a conventional system, in response to a read or write command, encrypted data is retrieved from storage and decrypted or data is encrypted and stored. While an encryption or security key may be stored on the secure disk drive, the encryption and decryption is handled by an external processor in a host device or by a microprocessor in the secure disk drive. Because the data must be first encrypted or decrypted before being processed as directed by the read or write command, software solutions for encryption and decryption have a large throughput and performance impact.

SUMMARY

The present general inventive concept provides faster performance and better security. Because encryption keys are generated and stored within the drive hardware, they never leave its confines and are never held in the operating system or by application software. Hardware encryption is more secure and less complex to manage.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a storage apparatus including a storage unit to store data, a processor unit to process the data according to a command received from an external device, and a key unit to simultaneously process encryption corresponding to the command when the processor unit processes the data.

The foregoing and/or other aspects and utilities of the present general inventive concept may also be achieved by providing a storage apparatus including a storage unit to store data, a processor unit to process the data according to a command received from an external device, a key unit to store a plurality of crypto keys, and a decoder unit to select one of the crypto keys according to address information of the command received from the external device.

The foregoing and/or other aspects and utilities of the present general inventive concept may also be achieved by providing a storage apparatus including a processor unit to perform processing of data according to a command received from an external device, a decoder unit to perform selection of crypto keys according to address information of the command received from the external device, wherein the processor and the decoder unit simultaneously performs the processing of the data and selection of the crypto keys, respectively, upon receipt of the command.

The foregoing and/or other aspects and utilities of the present general inventive concept may also be achieved by providing a storage system including a host apparatus to generate a command, and a storage apparatus connectable to the host apparatus, the storage apparatus including a storage unit to store data, a processor unit to process the data according to the command received from an external device, a key unit to store a plurality of crypto keys; and a decoder unit to select one of the crypto keys according to address information of the command received from the external device.

The foregoing and/or other aspects and utilities of the present general inventive concept may also be achieved by providing a storage system including a host apparatus to generate a command, and a storage apparatus connectable to the host apparatus, the storage apparatus including a processor unit to perform processing of data according to a command received from an external device, a decoder unit to perform selection of crypto keys according to address information of the command received from the external device, wherein the processor and the decoder unit simultaneously performs the processing of the data and selection of the crypto keys, respectively, upon receipt of the command.

The foregoing and/or other aspects and utilities of the present general inventive concept may also be achieved by providing a storage apparatus including a key unit to store a plurality of crypto keys, a decoder unit to select one of the crypto keys according to address information received from an external device, a memory unit to store data, and a control processor unit to manage read and write data from the memory unit using the selected crypto key, wherein the decoder unit selects one of the crypto keys independently from the control processor unit.

The foregoing and/or other aspects and utilities of the present general inventive concept may also be achieved by providing a solid state disk drive including a key unit to store a plurality of crypto keys, a decoder unit to select one of the crypto keys according to address information received from an external device, a memory unit to store data, and a control processor unit to manage read and write data from the memory unit using the selected crypto key, wherein the decoder unit selects one of the crypto keys independently from the control processor unit.

The foregoing and/or other aspects and utilities of the present general inventive concept may also be achieved by providing a data system including a host apparatus to generate a command, and a storage apparatus connectable to the host apparatus, the storage apparatus including a key unit to store a plurality of crypto keys, a decoder unit to select one of the crypto keys according to address information received from an external device, a memory unit to store data, and a control processor unit to manage read and write data from the memory unit using the selected crypto key, wherein the decoder unit selects one of the crypto keys independently from the control processor unit.

The foregoing and/or other aspects and utilities of the present general inventive concept may also be achieved by providing a method of encrypting data, the method including receiving a command, parsing an address from the command, receiving a logic block address range, generating a key flag corresponding to the logic block address range, and selecting a crypto key using the key flag.

The foregoing and/or other aspects and utilities of the present general inventive concept may also be achieved by providing a method of encrypting data, the method including receiving a write request, parsing an address from the write request, receiving a logic block address range, generating a key flag corresponding to the logic block address range, selecting a crypto key using the key flag, using the crypto key to encrypt data, and writing the encrypted data to memory.

The foregoing and/or other aspects and utilities of the present general inventive concept may also be achieved by providing a method of decrypting data, the method including receiving a command, parsing an address from the command, receiving a logic block address range, generating a key flag corresponding to the logic block address range, and selecting a crypto key using the key flag.

The foregoing and/or other aspects and utilities of the present general inventive concept may also be achieved by providing a method of decrypting data, the method including receiving a read request, parsing an address from the read request, receiving a logic block address range, generating a key flag corresponding to the logic block address range, selecting a crypto key using the key flag, using the crypto key to decrypt data, and reading the decrypted data from memory.

The foregoing and/or other aspects and utilities of the present general inventive concept may also be achieved by providing a method of performing an encrypting operation in a storage apparatus, the method including receiving a command, and simultaneously processing data according to the command and performing selection of crypto keys according to the address information of the command.

The foregoing and/or other aspects and utilities of the present general inventive concept may also be achieved by providing a computer readable medium to contain computer readable codes as a program to perform a method of performing an encrypting operation in a storage apparatus, the method including receiving a command, and simultaneously processing data according to the command and performing selection of crypto keys according to the address information of the command.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIGS. 2A and 2B are views illustrating a storage apparatus in communication with a host apparatus according to an embodiment of the present general inventive concept;

FIG. 5 is a view illustrating a frame information system according to an embodiment of the present general inventive concept;

FIG. 6 is a view illustrating a frame information system according to an embodiment of the present general inventive concept;

DETAILED DESCRIPTION OF THE EMBODIMENTS

Figure 1A:
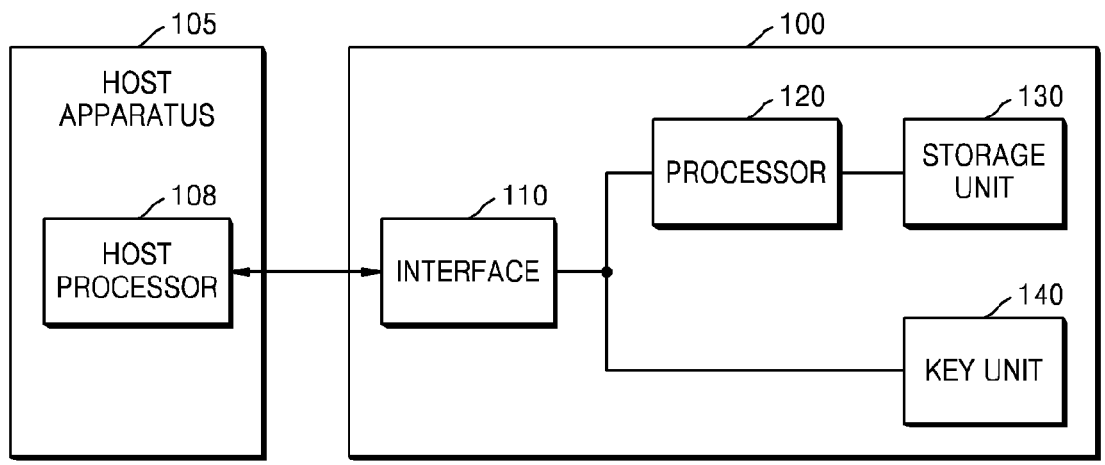
FIGS. 1A and 1B are views illustrating a storage apparatus in communication with a host apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Full disk encryption solutions use multiple security or encryption keys for encrypting different partitions. If an unauthorized user gains access to the computer, the unauthorized user does not have access to all files. File and folder encryption allows different keys for different portions of the disk. Thus an unauthorized user cannot extract information from still-encrypted files and folders.

Benefits of hardware encryption over a program-only encryption approach include faster performance and better security. Because encryption keys are generated and stored within the drive hardware, they never leave its confines and are never held in the operating system or by application software. Hardware encryption is more secure and less complex to manage.

An "encryption key," "security key," or "crypto key," terms which are used interchangeably hereinbelow, may be used in conjunction with the Advanced Encryption Standard (AES) or Data Encryption Standard (DES) to encrypt and/or decrypt data, or with another encryption system as appropriate.

FIGS. 1A, 1B, 2A, and 2B are views illustrating secure storage apparatuses 100 and 200 according to exemplary embodiments of the present general inventive concept.

Figure 1B:
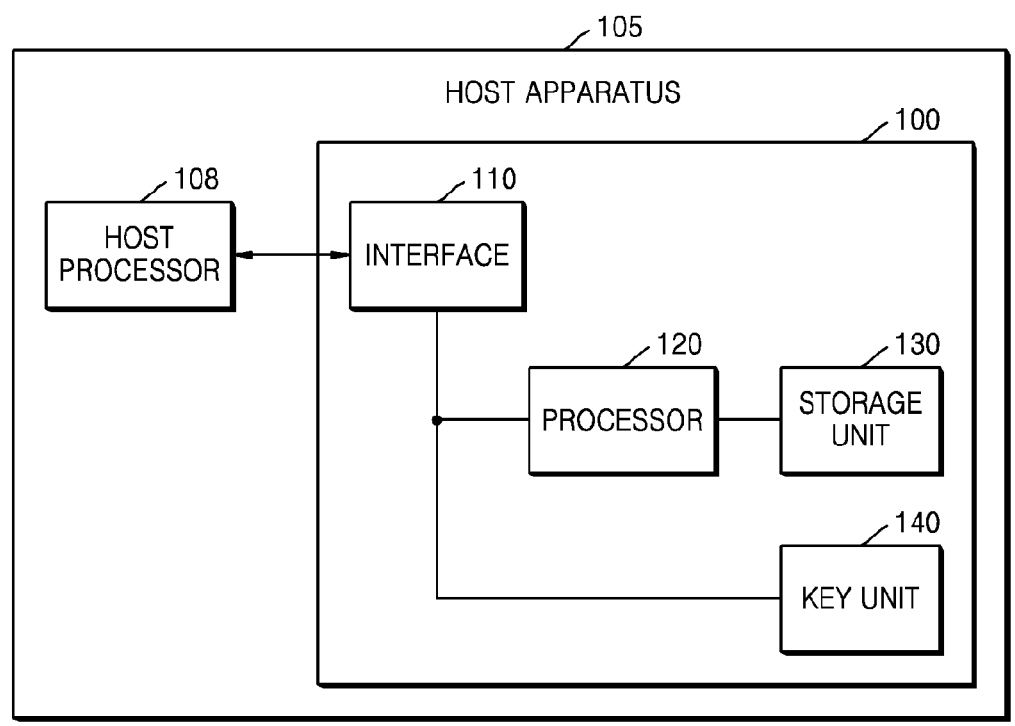

Referring to FIGS. 1A and 1B, the secure storage apparatus 100 includes an interface 110, a processor 120, a storage unit 130, and a key unit 140. The secure storage apparatus 100 communicates with a host processor 108 located in a host apparatus 105.

In FIG. 1A, the secure storage apparatus 100 is external to the host apparatus 105 including the host processor 108 and communicates through the interface 110. The secure storage apparatus 100 can be detachably attached to the host apparatus 105 through terminals therein.

In FIG. 1B, the secure storage apparatus 100 is located inside the host apparatus 105 and communicates with the host processor 108 through the interface 110. The secure storage apparatus 100 can be installed in the host apparatus 105. The host apparatus 105 may have at least one additional storage apparatus installed therein.

A user uses the host apparatus 105. The host apparatus 105 communicates with the secure storage apparatus 100 which transparently encrypts and decrypts data stored on the secure storage apparatus 100. The user may input a password upon boot or startup in order to access the secure storage apparatus 100 in a locked state. Alternatively, the user may not input a password but may access the secure storage apparatus 100 without restriction in an unlocked state. In either the locked or unlocked state, the data has already been encrypted. In the locked state, the user controls the security key by setting the password.

It is possible that a user may input a password to generate a document from data stored in the storage unit 130 with different restrictions or encryption/decryption levels or ranges.

In the locked state, a lost password can be recovered using several techniques. A challenge/response sequence can be used to recover the lost password. Alternatively, password protected encryption key files can be created and stored in a safe place.

The processor 120 processes data according to a command, e.g., a read/write command, received from the host processor 108. The processor 120 may be a microprocessor, microcontroller, digital signal processor, dedicated or general purpose programmed chip.

The storage unit 130 stores data. The storage unit 130 may be a semiconductor solid state disk drive (SSD) to store data. The storage unit 130 may be another type of memory storage, such as flash memory, a module or package of a plurality of semiconductor memory chips, a memory card, etc. Alternatively, the storage unit 130 may be another type of memory storage, such as a conventional hard disk drive (HDD), optical disk drive (ODD), etc. The storage unit 130 has a memory space (or physical memory space) to store data or information.

The key unit 140 simultaneously processes encryption and decryption corresponding to the read/write command received from the host processor 108 while the processor unit 120 processes the data in response to the command received from host processor 108. In the exemplary embodiment of the present general inventive concept, the key unit parses the command retrieving an address from the command, uses the address to look up a security key, and performs encryption or decryption of the data according to the read/write command. The key unit 140 may be a separate unit with a memory to store a security key list and a dedicated or general purpose microprocessor to perform the security key lookup and the encryption of the data.

The command may include a first command corresponding to the processing data by the processor 110 and a second command corresponding to encryption or decryption by the key unit 140. Also, the command can be simultaneously interpreted by the processor 120 and by the key unit 140 to simultaneously perform the data processing and encryption or decryption.

The security key list is related to the storage unit 130. The storage unit 130 is divided into n ranges, and each range has a unique security key associated with it that is used in encrypting and decrypting data contained therein. The range may be defined by the manufacturer and is a data amount. The security key list contains n security keys corresponding to the n ranges of the storage unit 130. The data in each range may have a fixed block size of, e.g., 64 bit, 128 bit, 192 bit, 256 bit, etc., and the security key for each range may be, e.g., 64 bit, 128 bit, 192 bit, 256 bit, etc. An address, which is parsed from the read/write command received from host processor 108, may be used in conjunction with the security key list to determine the security key needed for encryption and/or decryption of the specified data with the parsed address.

When the security key has been selected from the security key list using the parsed address from the read/write command received from host processor 108, the key unit 140 uses the security key to encrypt and/or decrypt the data. The key unit 140 may use the Advanced Encryption Standard (AES) or Data Encryption Standard (DES) to encrypt and/or decrypt the data, or may use another encryption system as appropriate.

The key unit 140 parses the address from the command and processes the encryption and/or decryption without utilizing the processor 120. Thus, the processor 120 can process the data as specified in the command, while the key unit 140 simultaneously processes the encryption or decryption of the data. The key unit 140 is able to encrypt or decrypt the data without interrupting the processor 120 or requiring control, while the processor 120 is able to process the data without interrupting the key unit 140. Neither the key unit 140 nor the processor 120 has priority over the other, and neither the key unit 140 nor the processor 120 interferes with the other.

The processer 120 processes the data, which may include performing a mapping operation to map a logical address to a corresponding physical address in the storage unit 130 according to the command. The processor 120 may perform additional processing of the data following the processing of the encryption by the key unit 140.

The processor 120 may not wait or delay the processing of data until the key unit 140 finishes the encryption or decryption processor. The processor 120 may perform a portion of the processing of data during the encryption or decryption process by the key unit 140. The processor 120 may prepare processing of data during the encryption or decryption process by the key unit 140 so that the processor 120 can complete the processing of data according to the command upon completion of the encryption or decryption process by the key unit 140.

The speed of simultaneously processing the encryption and data is faster than the speed of sequentially processing the encryption and data. A period of time, which may a single clock cycle or other period of time, is taken to simultaneously process the encryption and data, which is shorter than the period of time taken to sequentially process the encryption and data.

Figure 2B:
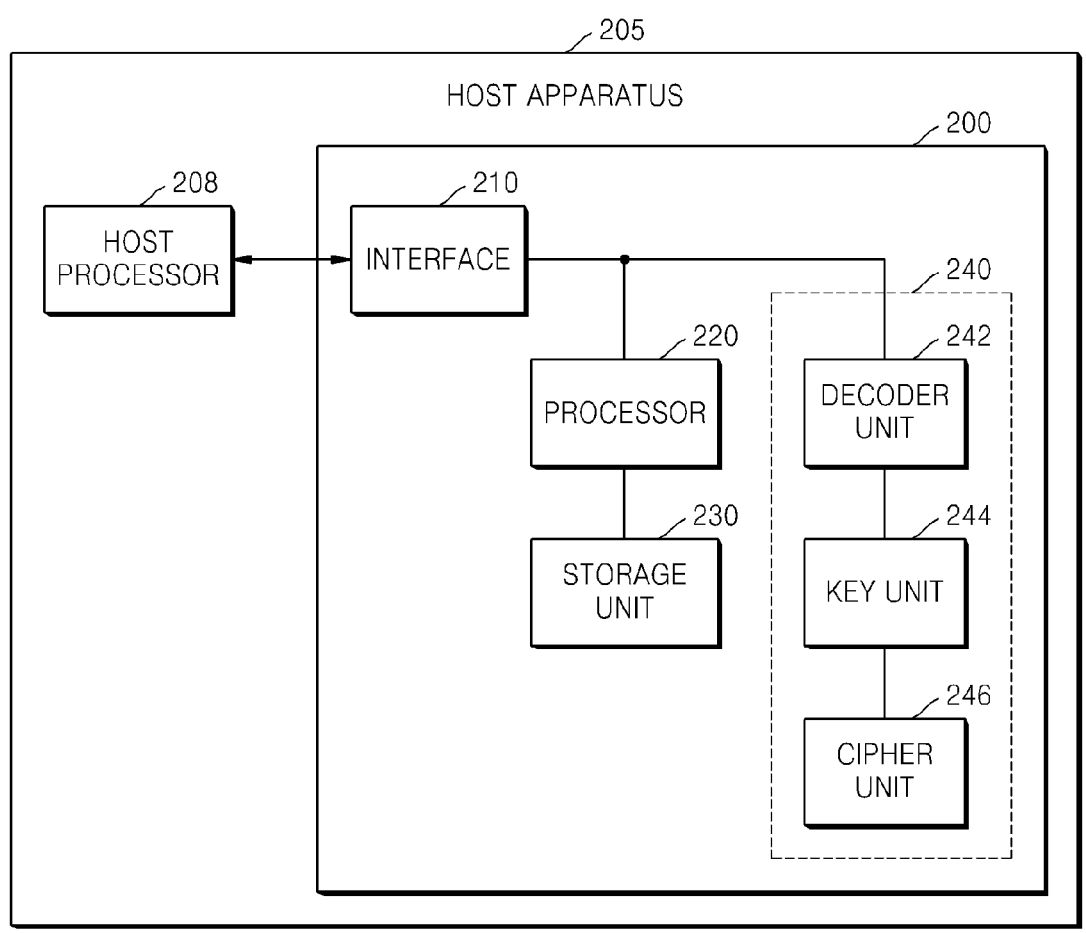

Referring to FIGS. 2A and 2B, the secure storage apparatus 200 includes an interface 210, a processor 220, a storage unit 230, and a security unit 240, which includes a decoder unit 242, a key unit 244, and a cipher unit 246. The secure storage apparatus 200 communicates with a host processor 208 located in a host apparatus 205.

In FIG. 2A, the secure storage apparatus 200 is external to the host apparatus 205 including the host processor 208 and communicates through the interface 210. The secure storage apparatus 200 can be detachably attached to the host apparatus 205 through terminals therein.

In FIG. 2B, the secure storage apparatus 200 is located inside the host apparatus 205 and communicates with the host processor 208 through the interface 210. The secure storage apparatus 200 can be installed in the host apparatus 205. The host apparatus 205 may have at least one additional storage apparatus installed therein.

A user uses the host apparatus 205. The host apparatus 205 communicates with the secure storage apparatus 200 which transparently encrypts and decrypts data stored on the secure storage apparatus 200. The user may input a password upon boot or startup in order to access the secure storage apparatus 200 in a locked state. Alternatively, the user may not input a password but may access the secure storage apparatus 200 without restriction in an unlocked state. In either the locked or unlocked state, the data has already been encrypted. In the locked state, the user controls the security key by setting the password.

It is possible that a user may input a password to generate a document from data stored in the storage unit 230 with different restrictions or encryption/decryption levels or ranges.

In the locked state, a lost password can be recovered using several techniques. A challenge/response sequence can be used to recover the lost password. Alternatively, password protected encryption key files can be created and stored in a safe place.

The processor 220 processes data according to a command, e.g., a read/write command, received from the host processor 208. The processor 220 may be a microprocessor, microcontroller, digital signal processor, dedicated or general purpose programmed chip.

The storage unit 230 stores data. The storage unit 230 may be a semiconductor solid state disk drive (SSD) to store data. The storage unit 230 may be another type of memory storage, such as flash memory, a module or package of a plurality of semiconductor memory chips, a memory card, etc. Alternatively, the storage unit 230 may be another type of memory storage, such as a conventional hard disk drive (HDD), optical disk drive (ODD), etc. The storage unit 230 has a memory space (or physical memory space) to store data or information.

The security unit 240 includes a decoder unit 242, a key unit 244, and a cipher unit 246.

The decoder unit 242 parses address information from the command received from the host apparatus 208 and selects a corresponding security key. The decoder unit 242, which may be a separate dedicated or general purpose circuit, may receive the command from the interface 210 via the processor 220 or may receive the command directly from the interface 210 and decode the command.

The command may include a first command corresponding to the processing data by the processor 210 and a second command corresponding to encryption or decryption by the decoder unit 242. Also, the command can be simultaneously interpreted by the processor 220 and by the decoder unit 242 to simultaneously perform the data processing and encryption or decryption.

The decoder unit 242 parses the command and determines an address from the command. The address, which is parsed from the read/write command received from host processor 208, may be used in conjunction with the key list stored in the key unit 244 to determine the security key needed for encryption and/or decryption of the specified data with the parsed address.

In the exemplary embodiment of the present general inventive concept, the key unit 244 stores a list of security keys. The key unit 244 may be a separate memory unit containing the key list, or may be located on the storage unit 230. The security key list is related to the storage unit 230. The storage unit 230 is divided into n ranges, and each range has a unique security key associated with it that is used in encrypting and decrypting data contained therein. The range may be defined by the manufacturer and is a data amount. The security key list contains n security keys corresponding to the n ranges of the storage unit 130. The data in each range may have a fixed block size of, e.g., 64 bit, 128 bit, 192 bit, 256 bit, etc., and the security key for each range may be, e.g., 64 bit, 128 bit, 192 bit, 256 bit, etc.

The decoder unit 242 may use the address to directly select the corresponding security key from the key list stored on the storage unit 230, or the decoder unit 242 may generate a key flag using the address parsed from the received command. The key flag can then be used to select the corresponding security key from the key list stored on the storage unit 230. The decoder unit 242 may compare the address to a reference to generate the key flag used to select the security key to encrypt or decrypt the data.

The cipher unit 246 performs an encrypting operation to encrypt data according to the selected crypto key. The cipher unit 246, which may be a separate dedicated or general purpose circuit, may be an Advanced Encryption System (AES) or Data Encryption System (DES) cipher, or any suitable cipher.

When the security key has been selected from the security key list stored in the key unit 250 by the decoder unit 242 using the parsed address from the read/write command received from host processor 208, the cipher unit 246 uses the security key to encrypt and/or decrypt the data. The cipher unit 246 may use the Advanced Encryption Standard (AES) or Data Encryption Standard (DES) to encrypt and/or decrypt the data, or may use another encryption system as appropriate.

The decoder unit 242 parses the address from the command and the cipher unit 246 processes the encryption and/or decryption without utilizing the processor 220. Thus, the processor 220 can process the data as specified in the command, while the decoder unit 240 simultaneously selects the security key. The cipher unit 246 is able to encrypt or decrypt the data without interrupting the processor 220 or requiring control, while the processor 220 is able to process the data without interrupting the cipher unit 246. Neither the decoder unit 242 nor the processor 220 has priority over the other, and neither the decoder unit 242 nor the processor 220 interferes with the other.

The processer 220 processes the data, which may include performing a mapping operation to map a logical address to a corresponding physical address in the storage unit 230 according to the command. The processor 220 may perform additional processing of the data following the processing of the encryption by the cipher unit 260. The processor 220 may output a signal to the host apparatus 205 according to the processed data and the encryption operation.

The processor 220 may not wait or delay the processing of data until the decoder unit 242 finishes the encryption or decryption processor. The processor 220 may perform a portion of the processing of data during the encryption or decryption process by the decoder unit 242. The processor 220 may prepare processing of data during the encryption or decryption process by the decoder unit 242 so that the processor 220 can complete the processing of data according to the command upon completion of the encryption or decryption process by the decoder unit 242.

The speed of simultaneously processing the encryption and data is faster than the speed of sequentially processing the encryption and data. A period of time, which may a single clock cycle or other period of time, is taken to simultaneously process the encryption and data, which is shorter than the period of time taken to sequentially process the encryption and data.

The processor 220 and the decoder unit 242 simultaneously perform the processing of the data and selection of the security keys, respectively, upon receipt of the command. The host apparatus 205 may communicate with a user by generating an interface signal to correspond to a user window to change the security keys. The decoder unit 242 may select the changed security keys. The decoder unit 242 selects one of the security keys independently from the processor 220 or the host processor 208.

Thus, the processor 220 does not perform encryption or decryption or control the decoder unit 242 in selecting the security key from the key list stored on the storage unit 244. The processor 220 outputs a signal to the host apparatus 205 according to the processed data and the encrypting operation. The processor 220 processes the data during a period when the decoder unit 242 selects the security key and the cipher unit 246 performs the encrypting operation. The processor 220 is allowed to output a signal generated from the processed data when the cipher unit 246 completes the encrypting operation. The decoder unit 242 generates a signal indicating an encryption operation to the processor 220.

Figure 3:
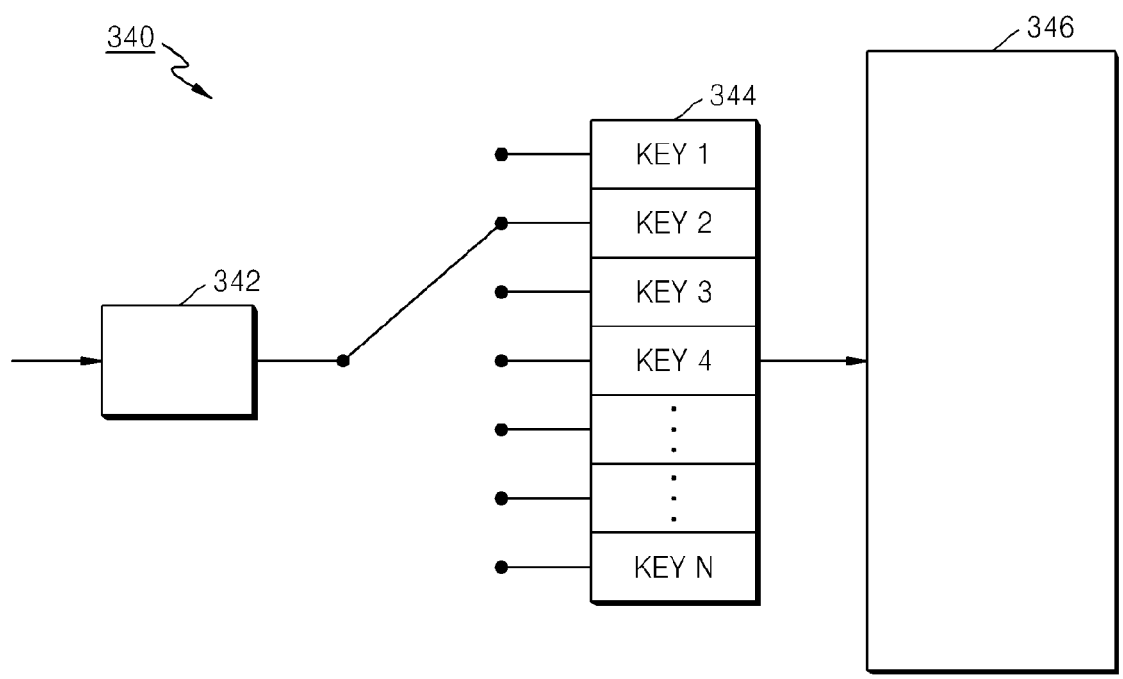
FIG. 3 is a view illustrating a portion of a storage apparatus according to an embodiment of the present general inventive concept.

Referring to FIG. 3, there is illustrated a security unit 340 showing an exemplary embodiment of the present general inventive concept. The decoder unit 242, the key unit 244, and the cipher unit 246 of FIG. 2 are described with reference to the security unit 340 which includes a decoder unit 342, a key unit 344, and a cipher unit 346 in more detail hereinbelow.

FIG. 3 includes a decoder unit 342, a key unit 344, and a cipher unit 346. The decoder unit 342 receives a command and parses an address from the command. The address may be a logic block address (LBA). The address or LBA is used to select a security key from the key unit 344. The key unit 344 includes key 1, key 2 . . . key n. Each key corresponds to a range of the storage unit 230 of the exemplary embodiment of FIG. 2. The security key is used in the cipher unit 346, which may be an Advanced Encryption System (AES) or Data Encryption System (DES) cipher, or any suitable cipher.

Figure 4:
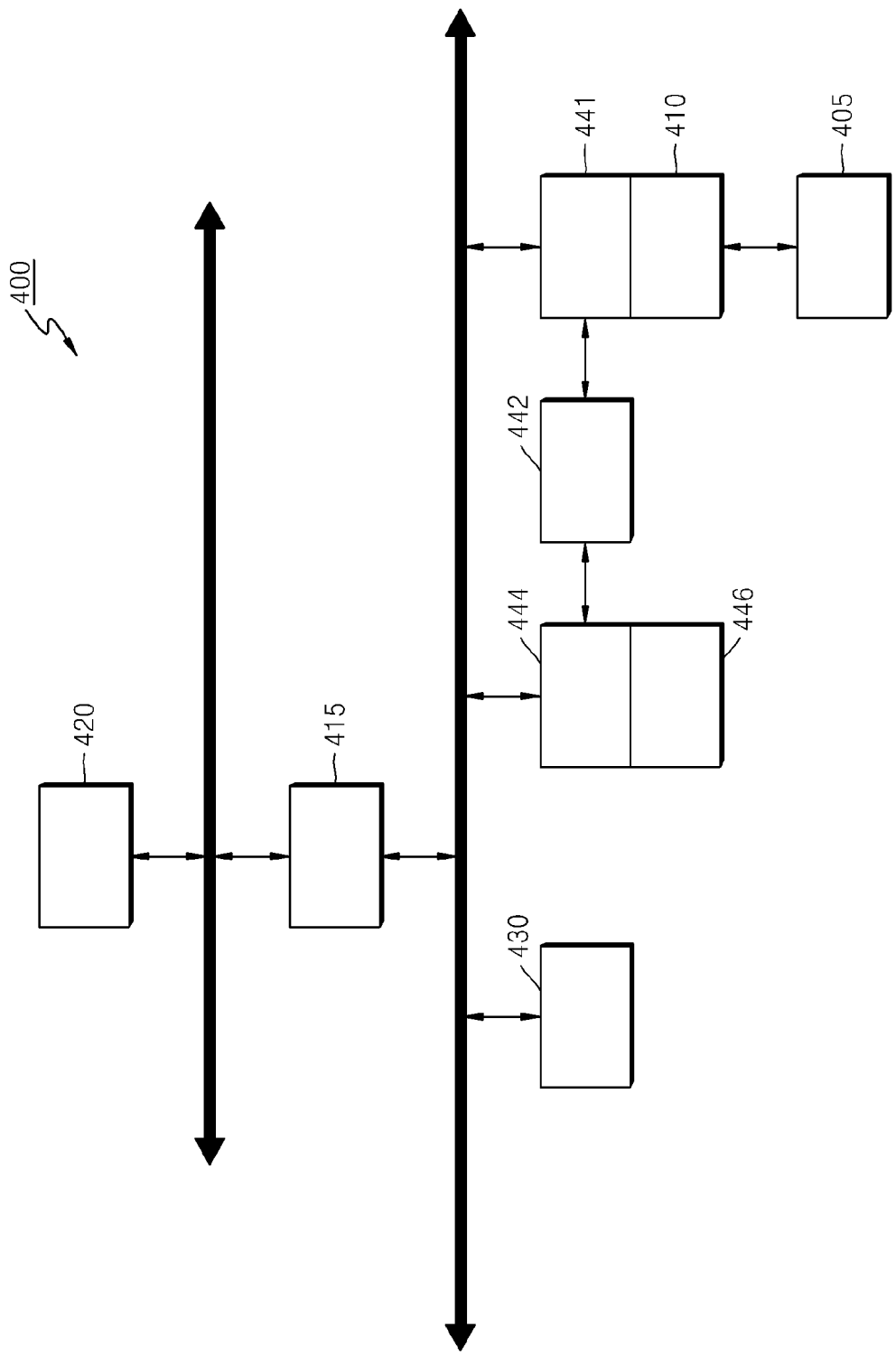
FIG. 4 is a block diagram illustrating a storage apparatus according to an embodiment of the present general inventive concept.

Referring to FIG. 4, there is illustrated a block diagram of a storage apparatus 400 showing an exemplary embodiment of the present general inventive concept. A storage apparatus 400 communicates with a processor 420 via a bus 415, and to an external device 405 through an interface 410. A serial-ATA drive and interface may be used, or any other suitable drive and interface standard may be used. Any suitable processor or host that sends commands and receives data from an external memory storage may be used. The processor 420 may include an additional memory unit, such as ROM or RAM to perform data processing.

A command parser 441 parses a command, rather than the processor 420, as is conventionally performed, such as a read or write command, and extracts an address. The operation of the command parser 441 is illustrated hereinbelow in FIGS. 5-7.

The address parsed by the command parser 441, which may be a LBA, is used by the LBA decoding unit 442, in conjunction with the key unit 444, to generate a security key. The security key is used in the cipher unit 446 to encrypt or decrypt data stored in memory 430 on the storage apparatus 400. Following the encryption or decryption, the data is passed to the processor 420 for processing. Because the parsing, decoding, and encrypting/decrypting happen in a single hardware solution, the data is not passed to the processor 420 for encryption/decryption prior to being passed to the processor 420 in response to the command.

Alternatively, the LBA decoding unit 442 may use the address to generate a key flag. The key flag is then passed to the cipher unit 446, which uses the key flag to select a security key from the key unit 444. The security key is then used by the cipher unit 446 to encrypt or decrypt the data stored in memory 430, as above.

The command parser 441 may send sub-commands to the processor 420 through the bus 415 and also to the LBA decoding unit 442. The processor 420 and the LBA decoding unit 442 may simultaneously perform the processing of the data and selection of the security keys, respectively, upon receipt of the command.

FIG. 5 illustrates an exemplary operation of the command parser 441 of FIG. 4. The command parser 441 receives a command from an external device, e.g., a host device 405, in the form a frame and parses the frame to determine an address specified in the frame. A conventional host-to-device frame information structure (FIS) in a serial-ATA hardware architecture implementation includes: a start of frame (SOF) delimiter, a payload including transport layer information, a cyclic redundancy check (CRC), and an end of frame (EOF) delimiter. The FIS also includes a logic block address 500, which may be in the form of cylinder, head, and sector, and includes Cyl High and Cyl Low, as well as Cyl High (exp) and Cyl Low (exp). Cyl High includes the contents of a cylinder high register of the storage unit 430, and Cyl Low includes the contents of a cylinder low register of the storage unit 430. Cyl High (exp) and Cyl Low (exp) include the contents of expanded address fields of the storage unit 430. The logic block address 500 is parsed by the command parser 441 and used by the LBA decoding unit 442 with the key unit 444 to generate a security key or key flag.

FIG. 6 illustrates a device-to-host frame information structure (FIS) in a serial-ATA hardware architecture implementation used by the command parser 441 of FIG. 4. The logic block address 600 may be in the form of cylinder, head, and sector, and includes Cyl High and Cyl Low, as well as Cyl High (exp) and Cyl Low (exp). The logic block address 600 is parsed by the command parser 441 and used by the LBA decoding unit 442 with the key unit 444 to generate a security key or key flag.

Figure 7:
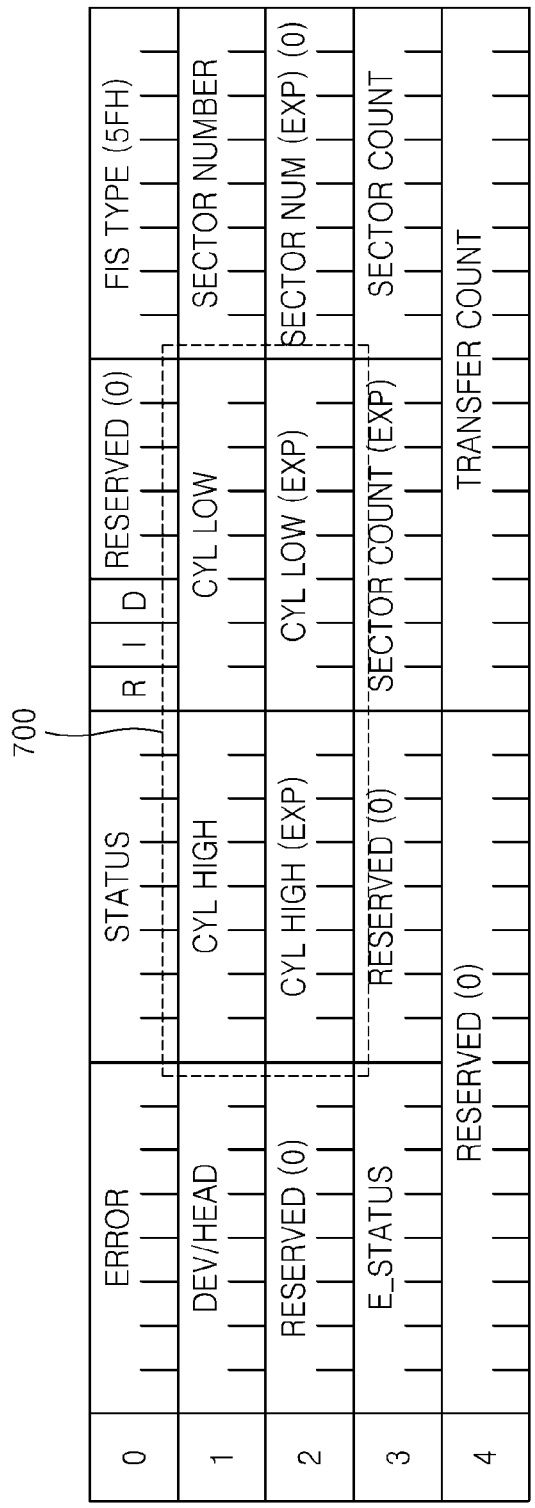
FIG. 7 is a view illustrating a frame information system according to an embodiment of the present general inventive concept.

FIG. 7 illustrates another device-to-host frame information structure (FIS) in a serial-ATA hardware architecture implementation used by the command parser 441 of FIG. 4. The logic block address 700 may be in the form of cylinder, head, and sector, and includes Cyl High and Cyl Low, as well as Cyl High (exp) and Cyl Low (exp). The logic block address 700 is parsed by the command parser 441 and used by the LBA decoding unit 442 with the key unit 444 to generate a security key or key flag.

FIGS. 8-11 illustrate various exemplary simplified computer architectures of embodiments of the present general inventive concept.

Figure 8:
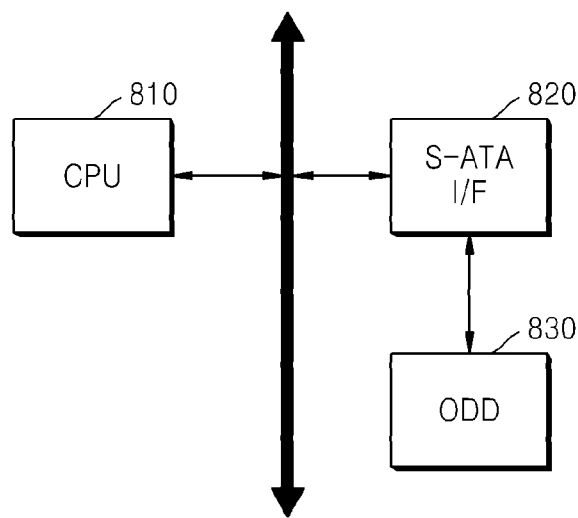
FIG. 8 is a view illustrating a computer architecture including a storage apparatus according to an embodiment of the present general inventive concept.

Referring to FIG. 8, the CPU 810 communicates via serial-ATA interface 820 with an optical disk drive (ODD) 830 using the method described below in FIG. 12. The ODD 830 may include a processor and a key unit that are used in encrypting and decrypting data, as described hereinabove with reference to FIG. 1, that is used by the CPU 810. Alternatively, the ODD 830 may include a processor, key unit, decoding unit and cipher unit that are used in encrypting and decrypting data, as described hereinabove with reference to FIG. 2, that is used by the CPU 810.

Figure 9:
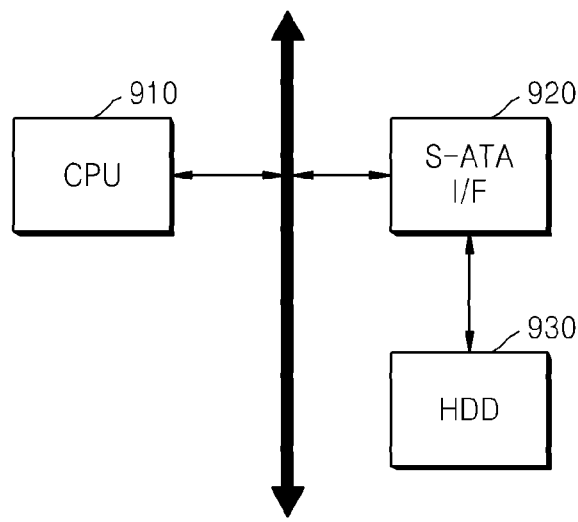
FIG. 9 is a view illustrating a computer architecture including a storage apparatus according to an embodiment of the present general inventive concept.

Referring to FIG. 9, the CPU 910 communicates via serial-ATA interface 920 with a hard disk drive (ODD) 930. The HDD 930 may include a processor and a key unit that are used in encrypting and decrypting data, as described hereinabove with reference to FIG. 1, that is used by the CPU 910. Alternatively, the HDD 930 may include a processor, key unit, decoding unit and cipher unit that are used in encrypting and decrypting data, as described hereinabove with reference to FIG. 2, that is used by the CPU 910.

Figure 10:
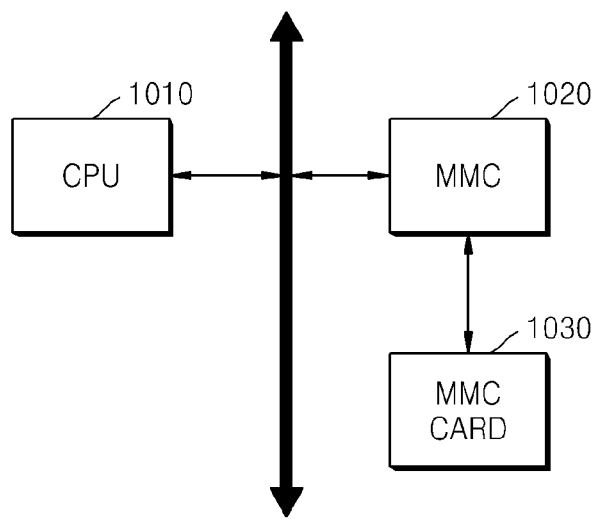
FIG. 10 is a view illustrating a computer architecture including a storage apparatus according to an embodiment of the present general inventive concept.

Referring to FIG. 10, the CPU 1010 communicates via a multimedia card controller 1020 with multimedia card 1030. The multimedia card 1030 may include a processor and a key unit that are used in encrypting and decrypting data, as described hereinabove with reference to FIG. 1, that is used by the CPU 1010. Alternatively, the multimedia card 1030 may include a processor, key unit, decoding unit and cipher unit that are used in encrypting and decrypting data, as described hereinabove with reference to FIG. 2, that is used by the CPU 1010.

Figure 11:
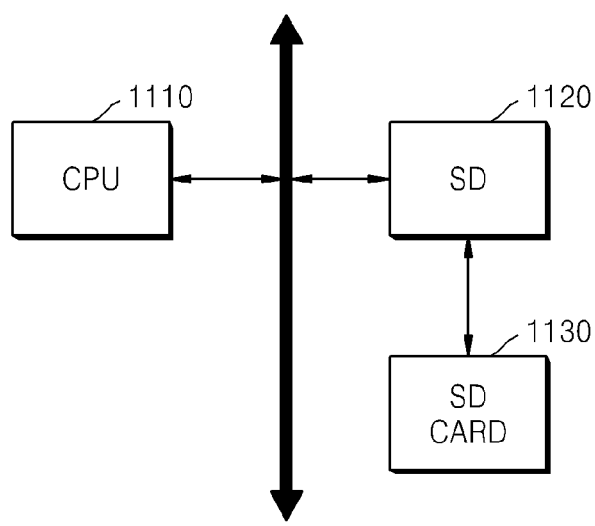
FIG. 11 is a view illustrating a computer architecture including a storage apparatus according to an embodiment of the present general inventive concept.

Referring to FIG. 11, the CPU 1110 communicates via a secure digital interface 1120 with a secure digital card (SD card) 1130 The SD card 1130 may include a processor and a key unit that are used in encrypting and decrypting data, as described hereinabove with reference to FIG. 1, that is used by the CPU 1110. Alternatively, the SD card 1130 may include a processor, key unit, decoding unit and cipher unit that are used in encrypting and decrypting data, as described hereinabove with reference to FIG. 2, that is used by the CPU 1110.

Figure 12:
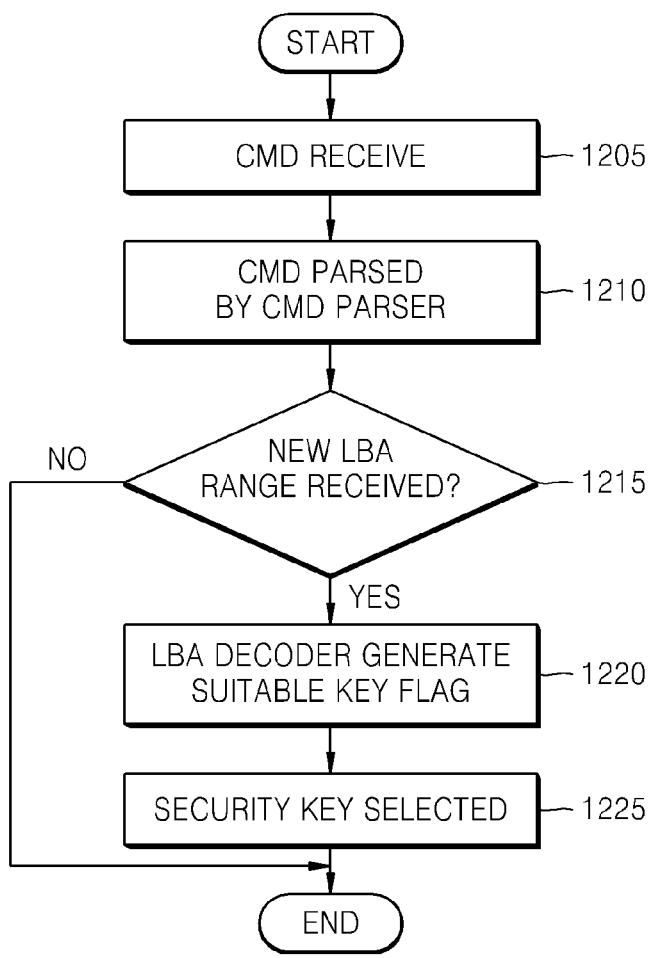
FIG. 12 is a flowchart illustrating a method to encrypt or decrypt data on a storage apparatus according to an embodiment of the present general inventive concept.

FIG. 12 shows a flowchart of an embodiment of the present general inventive concept. For illustrative purposes, FIG. 12 is described using the storage apparatus 400 of FIG. 4. A command is received by the storage apparatus 400 at operation S1205. The command is parsed by the command parser 441 at operation S1210. The logic block address (LBA) is parsed from the command, and the LBA is compared to the current LBA by the LBA decoding unit 442. If the LBA is different, then the new LBA is used by the LBA decoding unit 442 at operation S1215. If the LBA is the same, then the current LBA and security key is used in encryption and decryption by the cipher unit 446. The new LBA is used in the LBA decoding unit 442 to generate a suitable key flag at operation S1220. From the key flag generated by the LBA decoding unit 442, the security key is selected from the key unit 444 at operation S1225 and used thereafter in encrypting and decrypting data by the cipher unit 446.

Similarly, in the secure storage apparatus 100 of FIG. 1, the secure storage apparatus 100 receives a command. Simultaneously, the processor 120 processes data in response to the command, and the key unit 140 selects a security key using the address information of the command. The key unit 140 uses the security key to encrypt or decrypt the data.

Similarly, in the secure storage apparatus 200 of FIG. 1, the secure storage apparatus 200 receives a read/write request. The decoding unit 242 parses an address from the read/write request, which may be a logic block address, and generates a key flag corresponding to the logic block address. The key unit 244 selects a security key using the key flag, and the cipher unit 246 uses the security key to decrypt the data or to encrypt the data, as specified by the read/write request. When the data is decrypted or encrypted, the data is passed to the processor 220 for further processing, including passing the decrypted data to the host apparatus 205 or writing the encrypted data to storage 230.

Figure 13:
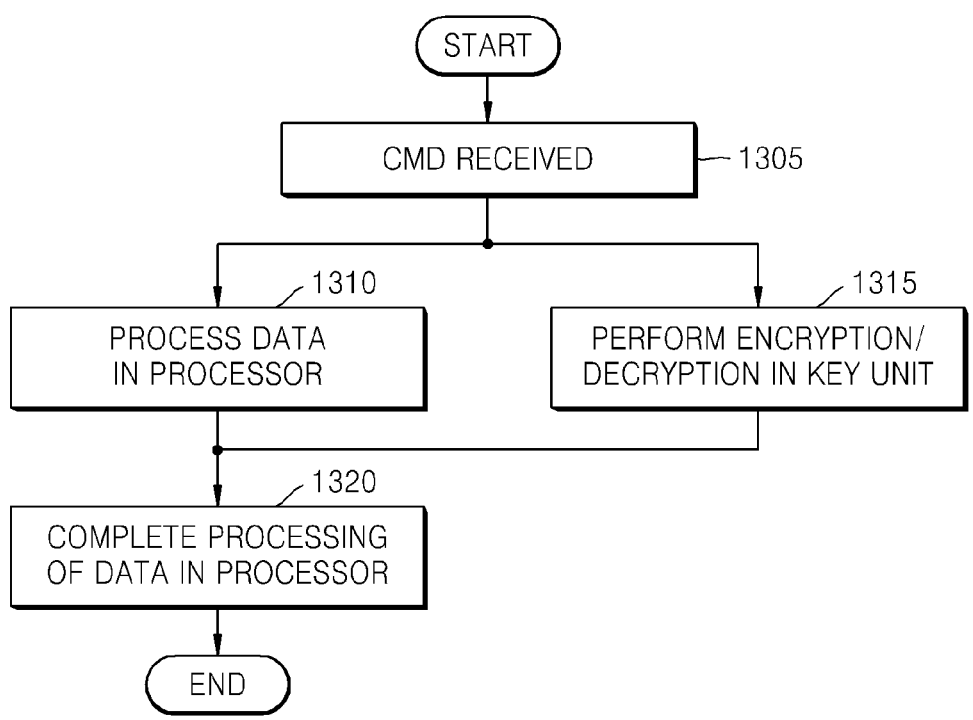
FIG. 13 is a flowchart illustrating a method to encrypt or decrypt data on a storage apparatus according to an embodiment of the present general inventive concept.

FIG. 13 shows a flowchart of an embodiment of the present general inventive concept. For illustrative purposes, FIG. 13 is described using the storage apparatus 100 of FIGS. 1A and 1B. A command is received by the storage apparatus 100 from the host apparatus 105 at operation S1305. The command is simultaneously passed to the processor 120 and the key unit 140. The processor 120 begins to process the data according to the command at operation S1310. The key unit 140 performs encryption or decryption of the data at operation S1215. When the encryption or decryption is complete, the processor 120 completes the processing of the encrypted or decrypted data at operation S1220. Thus, the processor 120 begins processing the data while the key unit 140 is performing encryption or decryption of the data, and when the encryption or decryption is complete, the processing of the encrypted or decrypted data is completed by the processor 120.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A storage apparatus comprising:
a storage unit including a plurality of ranges to store data;
a processor unit to process the data according to a command received from an external device; and
a key unit to simultaneously process encryption corresponding to the command without utilizing the processor unit when the processor unit processes the data,
wherein the key unit comprises a plurality of security keys respectively corresponding to the plurality of ranges of the storage unit, and at least two of the plurality of security keys have different sizes from each other, and
wherein the key unit parses address information from the command and selects a security key corresponding to one of the plurality of ranges according to the parsed address information.

2. The storage apparatus of claim 1, wherein the key unit simultaneously processes the encryption without interrupting the processor.

3. The storage apparatus of claim 1, wherein the key unit processes the encryption without control of the processor unit.

4. The storage apparatus of claim 1, wherein the processor unit process the data without interrupting the key unit.

5. The storage apparatus of claim 1, wherein the key unit and the processor unit communicate with each other after the key unit completes the processing of the encryption.

6. The storage apparatus of claim 1, wherein the key unit and the processor unit simultaneously process the encryption and the data, and the processing of the data is different from the processing the encryption.

7. The storage apparatus of claim 1, wherein the processing of the data and the processing encryption do not have a priority which is an order to sequentially perform the processing the encryption and the data according to the command.

8. The storage apparatus of claim 1, wherein the processing of the data and the processing encryption do not interfere each other.

9. The storage apparatus of claim 1, wherein the processing of the data comprises processing a mapping operation of mapping logical addresses to physical addresses according to the command.

10. The storage apparatus of claim 1, wherein the processor unit performs another processing of the data according to a result of the processing of the encryption.

11. The storage apparatus of claim 1, wherein:
a first period is taken to sequentially process the encryption and data;
a second period is taken to simultaneously process the encryption and data; and
the second period is shorter than the first period.

12. The storage apparatus of claim 1, wherein a speed of the simultaneously processing of the encryption and data is faster than a speed of the sequentially processing of the encryption and data.

13. A storage apparatus comprising:
a storage unit including a plurality of ranges to store data;
a processor unit to process the data according to a command received from an external device;
a key unit to store a plurality of crypto keys separate from the storage unit; and
a decoder unit to select one of the crypto keys according to address information of the command received from the external device,
wherein the plurality of crypto keys respectively correspond to the plurality of ranges of the storage unit, and at least two of the plurality of crypto keys have different sizes from each other, and
wherein the decoder unit parses the address information from the command and selects a crypto key corresponding to one of the plurality of ranges according to the parsed address information.

14. The storage apparatus of claim 13, wherein the processor and the decoder unit simultaneously performs the processing of the data and selection of the crypto keys, respectively, upon receipt of the command.

15. The storage apparatus of claim 13, further comprising:
a cipher unit to perform an encrypting operation to crypt data according to the selected crypto key.

16. The storage apparatus of claim 15, wherein:
the processor unit outputs a signal to the external device according to the processed data and the encrypting operation.

17. The storage apparatus of claim 15, wherein:
the processor unit processes the data during a period when the decoder unit selects the crypto keys and the cipher unit performs the encrypting operation.

18. The storage apparatus of claim 15, wherein:
the processor unit is allowed to output a signal generated from the processed data when the cipher unit completes the encrypting operation.

19. The storage apparatus of claim 13, wherein the decoder generates a signal indicating an encryption operation to the processor unit.

20. The storage apparatus of claim 13, wherein the decoder unit compares the address information to a reference to generate a signal to select the crypto key to crypt the data.

21. The storage apparatus of claim 13, wherein the decoder unit generates a key flag representing a selection of the one crypto key.

22. The storage apparatus of claim 13, wherein the plurality of crypto keys comprise a multiple of 64 bits.

23. The storage apparatus of claim 13, wherein the processor unit does not perform an encryption operation of the decoder unit according to the command.

24. The storage apparatus of claim 13, wherein the decoder unit comprises a command analyzing unit to analyze a command from the external device to obtain the address information in real time.

25. The storage apparatus of claim 13, wherein the decoder unit comprises an address converting unit to connect the address information to the one crypto key corresponding to the address information in real time.

26. The storage apparatus of claim 13, wherein:
an encrypting operation is completed according to the selected crypto key; and
the processor unit outputs another data to the external device according to the processing data and the completion of the encrypting operation.

27. The storage apparatus of claim 13, further comprising:
an interface unit to receive the command from the external device,
wherein the processor unit and the decoder unit receives the command from the interface unit to perform the processing of the data and an encrypting operation, respectively, according to the received command.

28. The storage apparatus of claim 15, further comprising:
a data bus connected to the processor unit and the decoder to transmit the command to the respective ones of the processor unit and the decoder.

29. The storage apparatus of claim 16, wherein the data bus comprises a first terminal connected to the processor unit and a second terminal connected to the decoder unit.

30. The storage apparatus of claim 13, further comprising:
a housing connectable to the external device to accommodate the storage unit, the processor unit, the key unit, and the decoder unit,
wherein the processor unit and the decoder unit are spaced apart from each other within the housing.

31. The storage apparatus of claim 13, wherein the decoder unit is not controlled by the processor unit during selection of the crypto key in the encryption operation.

32. A storage apparatus comprising:
a storage unit including a plurality of ranges to store data;
a processor unit to perform processing of the data according to a command received from an external device;
a decoder unit to perform selection of crypto keys without utilizing the processor unit according to address information of the command received from the external device,
wherein the processor and the decoder unit simultaneously performs the processing of the data and selection of the crypto keys, respectively, upon receipt of the command,
wherein the crypto keys respectively correspond to the plurality of ranges of the storage unit, and at least two of the crypto keys have different sizes from each other, and
wherein the decoder unit parses the address information from the command and selects a crypto key corresponding to one of the plurality of ranges according to the parsed address information.

33. A storage system comprising:
a host apparatus to generate a command; and
a storage apparatus connectable to the host apparatus, the storage apparatus comprising:

a storage unit including a plurality of ranges to store data;
a processor unit to process the data according to the command received from an external device;
a key unit to store a plurality of crypto keys separate from the storage unit; and
a decoder unit to select one of the crypto keys according to address information of the command received from the external device,
wherein the plurality of crypto keys respectively correspond to the plurality of ranges of the storage unit, and at least two of the plurality of crypto keys have different sizes from each other, and
wherein the decoder unit parses the address information from the command and selects a crypto key corresponding to one of the plurality of ranges according to the parsed address information.

34. A storage system comprising:
a host apparatus to generate a command; and
a storage apparatus connectable to the host apparatus, the storage apparatus comprising:
a storage unit including a plurality of ranges to store data;
a processor unit to perform processing of the data according to a command received from an external device;
a decoder unit to perform selection of crypto keys without utilizing the processor unit according to address information of the command received from the external device,
wherein the processor and the decoder unit simultaneously performs the processing of the data and selection of the crypto keys, respectively, upon receipt of the command,
wherein the crypto keys respectively correspond to the plurality of ranges of the storage unit, and at least two of the crypto keys have different sizes from each other, and
wherein the decoder unit parses the address information from the command and selects a crypto key corresponding to one of the plurality of ranges according to the parsed address information.

35. The storage system of claim 34, wherein:
the host apparatus generates an interface signal to correspond to a user window to change the crypto keys.

36. The storage system of claim 35, wherein:
the decoder performs selection of the changed crypto keys.

37. A storage apparatus comprising:
a memory unit including a plurality of ranges to store data;
a key unit to store a plurality of crypto keys respectively corresponding to the plurality of ranges of the memory unit;
a decoder unit to select one of the crypto keys according to address information received from an external device; and
a control processor unit to manage read and write data from the memory unit using the selected crypto key,
wherein the decoder unit parses the address information from the command and selects one of the crypto keys corresponding to one of the plurality of ranges according to the parsed address information independently from the control processor unit, and
wherein at least two of the plurality of crypto keys have different sizes from each other.

38. A solid state disk drive comprising:
a memory unit including a plurality of ranges to store data;
a key unit to store a plurality of crypto keys respectively corresponding to the plurality of ranges of the memory unit;
a decoder unit to select one of the crypto keys according to address information received from an external device;
a control processor unit to manage read and write data from the memory unit using the selected crypto key,
wherein the decoder unit parses the address information from the command and selects one of the crypto keys corresponding to one of the plurality of ranges according to the parsed address information independently from the control processor unit, and
wherein at least two of the plurality of crypto keys have different sizes from each other.

39. A data system comprising:
a host apparatus to generate a command; and
a storage apparatus connectable to the host apparatus, the storage apparatus comprising:
a memory unit including a plurality of ranges to store data;
a key unit to store a plurality of crypto keys respectively corresponding to the plurality of ranges of the memory unit;
a decoder unit to select one of the crypto keys according to address information received from an external device; and
a control processor unit to manage read and write data from the memory unit using the selected crypto key,
wherein the decoder unit parses the address information from the command and selects one of the crypto keys corresponding to one of the plurality of ranges according to the parsed address information independently from the control processor unit, and
wherein at least two of the plurality of crypto keys have different sizes from each other.

40. A method of encrypting data, the method comprising the steps of:
receiving a command;
parsing an address from the command;
receiving a logic block address range;
comparing the address to a reference to generate a key flag corresponding to the logic block address range; and
selecting a crypto key from among a plurality of crypto keys by using the key flag,
wherein the plurality of crypto keys respectively correspond to a plurality of ranges of a storage unit, at least two of the plurality of crypto keys have different sizes from each other, and the selected crypto key corresponds to one of the plurality of ranges according to the parsed address.

41. A method of encrypting data, the method comprising the steps of:
receiving a write request;
parsing an address from the write request;
receiving a logic block address range;
comparing the address to a reference to generate a key flag corresponding to the logic block address range;
selecting a crypto key from among a plurality of crypto keys by using the key flag;
using the crypto key to encrypt data; and
writing the encrypted data to memory,
wherein the plurality of crypto keys respectively correspond to a plurality of ranges of a storage unit, at least two of the plurality of crypto keys have different sizes from each other, and the selected crypto key corresponds to one of the plurality of ranges according to the parsed address.

42. A method of decrypting data, the method comprising the steps of:
receiving a command;

parsing an address from the command;
receiving a logic block address range;
comparing the address to a reference to generate a key flag corresponding to the logic block address range; and
selecting a crypto key from among a plurality of crypto keys by using the key flag,
wherein the plurality of crypto keys respectively correspond to a plurality of ranges of a storage unit, at least two of the plurality of crypto keys have different sizes from each other, and the selected crypto key corresponds to one of the plurality of ranges according to the parsed address.

43. A method of decrypting data, the method comprising the steps of:
receiving a read request;
parsing an address from the read request;
receiving a logic block address range;
comparing the address to a reference to generate a key flag corresponding to the logic block address range;
selecting a crypto key from among a plurality of crypto keys by using the key flag;
using the crypto key to decrypt data; and
reading the decrypted data from memory,
wherein the plurality of crypto keys respectively correspond to a plurality of ranges of a storage unit, at least two of the plurality of crypto keys have different sizes from each other, and the selected crypto key corresponds to one of the plurality of ranges according to the parsed address.

44. A method of performing an encrypting operation in a storage apparatus, the method comprising:
receiving a command;
simultaneously passing the command to a processor unit and a key unit; and
simultaneously processing data according to the command in the processor unit and performing selection of crypto keys from among a plurality of crypto keys according to address information of the command in the key unit,
wherein the plurality of crypto keys respectively correspond to a plurality of ranges of a storage unit, at least two of the plurality of crypto keys have different sizes from each other, and each selected crypto key corresponds to one of the plurality of ranges according to the address information.

45. A non-transitory computer readable medium to contain computer readable codes as a program to perform a method of performing an encrypting operation in a storage apparatus, the method comprising:
receiving a command;
simultaneously passing the command to a processor unit and a key unit; and
simultaneously processing data according to the command in the processor unit and performing selection of crypto keys from among a plurality of crypto keys according to address information of the command in the key unit,
wherein the plurality of crypto keys respectively correspond to a plurality of ranges of a storage unit, at least two of the plurality of crypto keys have different sizes from each other, and each selected crypto key corresponds to one of the plurality of ranges according to the address information.

46. The storage apparatus of claim 1 further comprising:
a first path through which the command is provided to the processor unit and a second path through which the command is provided to the key unit,
wherein the first path is separated from the second path, and a crypto key which is used for the encryption is selected without interrupting the processor.

47. The storage apparatus of claim 1, wherein:
the key unit parses an address from the command and simultaneously processes the encryption using the parsed address.

48. The method of claim 40, wherein:
the selecting a crypto key is performed simultaneously with processing data according to the command.

* * * * *